United States Patent
Yamakawa et al.

(10) Patent No.: US 9,825,575 B2
(45) Date of Patent: Nov. 21, 2017

(54) POWER CONVERTING APPARATUS, DEHUMIDIFIER, AIR CONDITIONER, AND REFRIGERATION APPARATUS

(71) Applicant: Mitsubishi Electric Corporation, Tokyo (JP)

(72) Inventors: Takashi Yamakawa, Tokyo (JP); Koichi Arisawa, Tokyo (JP); Kazunori Hatakeyama, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/312,820

(22) PCT Filed: Jul. 4, 2014

(86) PCT No.: PCT/JP2014/067935
§ 371 (c)(1),
(2) Date: Nov. 21, 2016

(87) PCT Pub. No.: WO2016/002074
PCT Pub. Date: Jan. 7, 2016

(65) Prior Publication Data
US 2017/0214354 A1  Jul. 27, 2017

(51) Int. Cl.
*H02P 6/00* (2016.01)
*H02M 5/45* (2006.01)
(Continued)

(52) U.S. Cl.
CPC ............ *H02P 27/08* (2013.01); *F24F 1/0007* (2013.01); *F24F 13/24* (2013.01); *H02M 5/4585* (2013.01);
(Continued)

(58) Field of Classification Search
None
See application file for complete search history.

(56) References Cited

U.S. PATENT DOCUMENTS 5,010,739 A   4/1991  Isshiki et al.
5,068,777 A   11/1991  Ito
(Continued)

FOREIGN PATENT DOCUMENTS

JP   01-194871 A   8/1989
JP   03-037383 A   2/1991
(Continued)

OTHER PUBLICATIONS

Office Action dated Nov. 4, 2015 issued in the corresponding TW Patent Application No. 103139165 (and partial English translation).
(Continued)

*Primary Examiner* — Bentsu Ro
*Assistant Examiner* — Zemenay Truneh
(74) *Attorney, Agent, or Firm* — Posz Law Group, PLC (57) ABSTRACT

A power converting apparatus outputs an alternating-current power to drive an electric motor, and includes: a switching circuit that converts an input direct-current power to an alternating-current power based on driving of MOS-FETs and outputs the alternating-current power; and a driving control unit capable of controlling a carrier frequency and controlling the driving of the MOS-FETs. The driving control unit controls the carrier frequency on the basis of a noise level of a carrier noise obtained by combining noises that occur in the electric motor and the power converting apparatus due to the driving of the MOS-FETs at the carrier frequency and a noise level of driving noises from a plurality of noise sources that occur irrespective of the carrier frequency in the same housing in which the power converting apparatus and the electric motor are contained.

18 Claims, 6 Drawing Sheets

(51) Int. Cl.
*H02P 27/08* (2006.01)
*H02M 5/458* (2006.01)
*F24F 1/00* (2011.01)
*F24F 13/24* (2006.01)
*H02M 7/5387* (2007.01)

(52) U.S. Cl.
CPC ....... *F24F 2221/12* (2013.01); *H02M 7/5387* (2013.01)

(56) References Cited

U.S. PATENT DOCUMENTS

| | | | |
|---|---|---|---|
| 7,400,109 | B2 | 7/2008 | Nomura et al. |
| 7,923,961 | B2 | 4/2011 | Takamatsu et al. |
| 8,278,859 | B2 | 10/2012 | Sakai et al. |
| 2001/0036093 | A1* | 11/2001 | Tanikawa .......... H02M 7/53871 363/37 |

FOREIGN PATENT DOCUMENTS

| | | |
|---|---|---|
| JP | 03-059339 A | 3/1991 |
| JP | 03-082396 A | 4/1991 |
| JP | 07-167480 A | 7/1995 |
| JP | 2001-186787 A | 7/2001 |
| JP | 2002-272126 A | 9/2002 |
| JP | 2004-048844 A | 2/2004 |
| JP | 2004-328912 A | 11/2004 |
| JP | 2005-176437 A | 6/2005 |
| JP | 2006-025565 A | 1/2006 |
| JP | 3829625 B2 | 7/2006 |
| JP | 2006-217776 A | 8/2006 |
| JP | 2006-280016 A | 10/2006 |
| JP | 3891175 B2 | 12/2006 |
| JP | 2010-057243 A | 3/2010 |
| JP | 2010-091269 A | 4/2010 |
| JP | 2011-041336 A | 2/2011 |
| JP | 2011-239547 A | 11/2011 |
| TW | 201414173 A | 4/2014 |

OTHER PUBLICATIONS

Final Office Action dated Jun. 1, 2016 issued in the corresponding TW Patent Application No. 103139165 (and partial English translation).
International Search Report of the International Searching Authority dated Sep. 16, 2014 for the corresponding international application No. PCT/JP2014/067935 (and English translation).

* cited by examiner

POWER CONVERTING APPARATUS, DEHUMIDIFIER, AIR CONDITIONER, AND REFRIGERATION APPARATUS

CROSS REFERENCE TO RELATED APPLICATION

This application is a U.S. national stage application of International Patent Application No. PCT/JP2014/067935 filed on Jul. 4, 2014.

TECHNICAL FIELD

The present invention relates to a power converting apparatus, a dehumidifier, an air conditioner, and a refrigeration apparatus.

BACKGROUND

Conventionally, inverter driving becomes common in an air conditioner. In an inverter and an electric motor connected to the inverter, a carrier noise that is a noise caused by switching of switching elements occurs due to an influence of a carrier frequency. A noise level of the carrier noise is different according to the carrier frequency. As a measure of reducing the carrier noise, there is a method of using an acoustic absorbent or an acoustic insulator in order to reduce noises around the carrier frequency. Further, Patent Literature 1 listed below discloses a technique for an electric-motor driving device that achieves quieting effect by setting the carrier frequency to a high frequency beyond the human audible band.

PATENT LITERATURE

Patent Literature 1: Japanese Patent Application Laid-open No. H7-167480

However, according to the conventional technique mentioned above, because the carrier frequency is set higher, in the switching elements in the inverter, a component temperature increases due to an increase in losses and an on-resistance loss at the time of high output of the inverter, and the elements may be possibly damaged. Therefore, there has been a problem that the cost increases due to use of switching elements having a large current capacity or due to addition of a measure for heat radiation to an apparatus mounted with the inverter. There has been an additional problem that the apparatus becomes larger with an increase in size of a circuit.

SUMMARY

The present invention has been achieved in view of the above circumstances, and an object of the present invention is to provide a power converting apparatus that can realize downsizing, weight saving and low cost while suppressing an increase in noise.

In order to solve the above-mentioned problems and achieve the object, the present invention provides a power converting apparatus that outputs an alternating-current power to drive an electric motor, the power converting apparatus comprising: a switching circuit that converts, based on driving of switching elements, an input direct-current power into an alternating-current power and outputs the alternating-current power; and a driving control unit capable of controlling a carrier frequency and controlling the driving of the switching elements, wherein the driving control unit controls the carrier frequency on the basis of a noise level of a carrier noise obtained by combining noises that occur in the electric motor and the power converting apparatus due to the driving of the switching elements at the carrier frequency, and a noise level of driving noises from a plurality of noise sources that occur irrespective of the carrier frequency in one and the same housing in which the power converting apparatus and the electric motor are contained.

The power converting apparatus according to the present invention can realize downsizing, weight saving and low cost while suppressing an increase in noise.

DETAILED DESCRIPTION

Embodiments of a power converting apparatus according to the present invention will be described below in detail with reference to the accompanying drawings. The present invention is not limited to the embodiments.

First Embodiment

Figure 1:
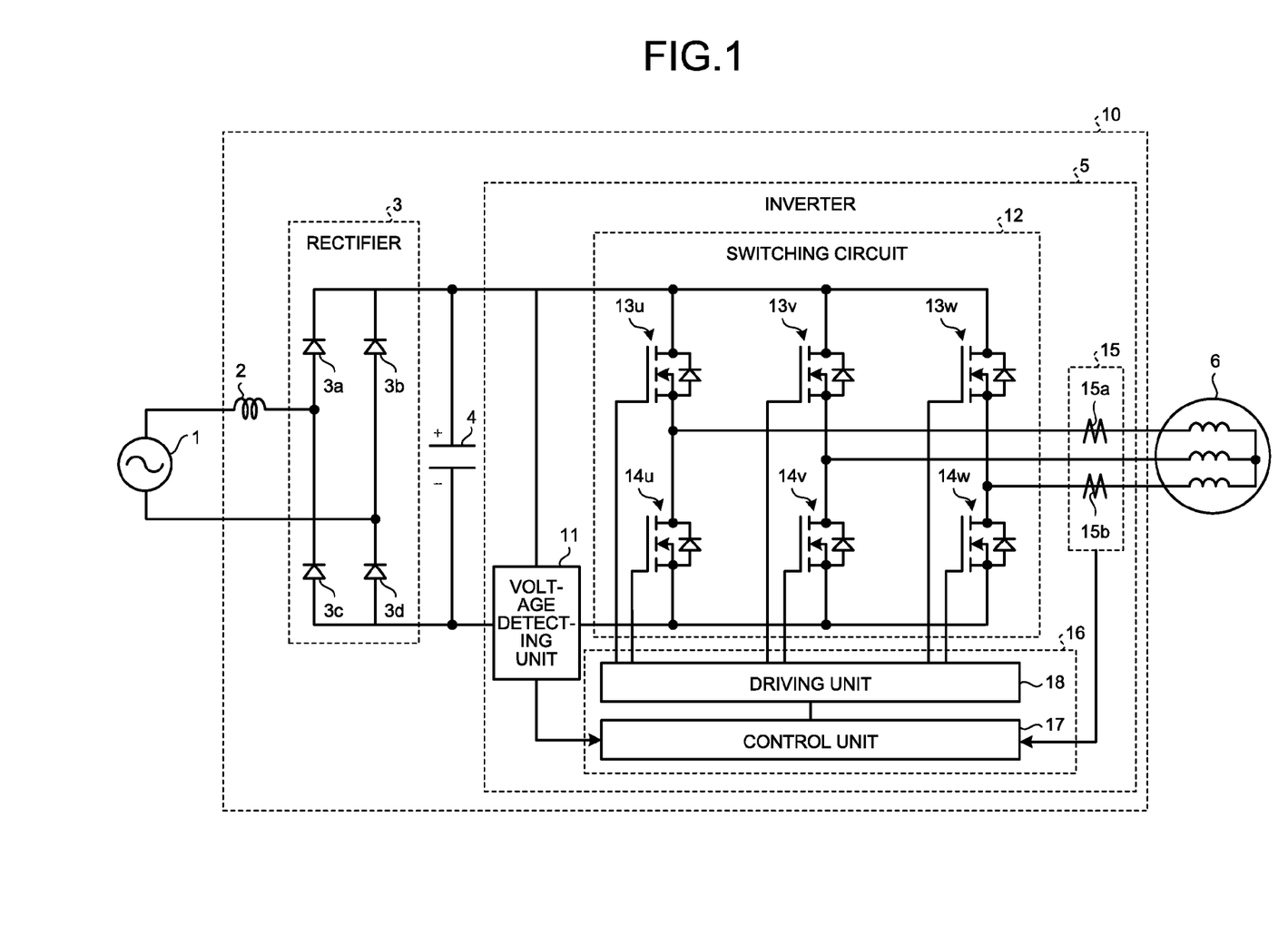
FIG. 1 is a diagram illustrating a configuration example of a power converting apparatus according to a first embodiment.

FIG. 1 is a diagram illustrating a configuration example of a power converting apparatus 10 according to a first embodiment. The power converting apparatus 10 includes a reactor 2 connected to an alternating-current power source 1 that outputs an alternating-current power, a rectifier 3 including rectifying devices 3a, 3b, 3c and 3d to rectify the alternating-current power to a direct-current power, a smoothing capacitor 4 as a smoothing circuit that smooths the rectified direct-current voltage, and an inverter 5 connected in parallel to the smoothing capacitor 4 to convert the direct-current power to an alternating-current power and output the alternating-current power so as to drive an electric motor 6.

The inverter 5 includes a voltage detecting unit 11, a switching circuit 12, a current detecting unit 15, and a driving control unit 16.

The voltage detecting unit 11 is configured using, for example, a voltage-dividing circuit including a resistor and a capacitor, an AD (Analog to Digital) converter, and an amplifier, to detect a direct-current voltage Vdc. The voltage detecting unit 11 outputs the detected direct-current voltage Vdc to the driving control unit 16. The driving control unit 16 uses an AD converter and other devices installed therein to convert a value of the direct-current voltage Vdc into data indicating information of the direct-current voltage Vdc. A method of detecting the direct-current voltage Vdc in the voltage detecting unit 11 is just an example, and the present invention is not limited thereto. The direct-current voltage Vdc may be detected using other methods.

The switching circuit 12 includes three phase arms comprised of upper arms of respective phases on an upstream side along an application direction of the direct-current voltage Vdc and on a high voltage side, and lower arms of the respective phases on a downstream side along the application direction of the direct-current voltage Vdc and on a low voltage side, which correspond to the upper arms of the respective phases. Specifically, the switching circuit 12 includes MOS-FETs 13u, 13v and 13w that are the upper arms of the respective phases, and MOS-FETs 14u, 14v and 14w that are the lower arms of the respective phases, which are switching elements. The switching circuit 12 drives the respective MOS-FETs 13u, 13v, 13w, 14u, 14v and 14w according to respective PWM (Pulse Width Modulation) signals Up, Un, Vp, Vn, Wp and Wn from the driving control unit 16, and converts the direct-current power to an alternating-current power and outputs the alternating-current power.

The current detecting unit 15 includes a current detecting element 15a that detects a u-phase current Iu of the electric motor 6, and a current detecting element 15b that detects a w-phase current Iw. In the present embodiment, the current detecting unit 15 detects a voltage between both ends of the current detecting elements 15a and 15b and outputs the detected voltage to the driving control unit 16. The driving control unit 16 uses the AD converter and other devices installed therein to convert the voltage across each of the current detecting elements 15a and 15b detected in the current detecting unit 15 into numerical data representing a voltage value, to convert the voltage into data indicating information of the u-phase current Iu and the w-phase current Iw flowing in the electric motor 6. The driving control unit 16 uses such a feature of a three-phase balancing inverter that a sum of three-phase currents becomes zero to obtain data indicating information of a v-phase current Iv. The method of deriving respective phase currents flowing to the electric motor 6 in the current detecting unit 15 is just one example, and the present invention is not limited thereto. The respective phase currents may be derived using other methods. The current detecting unit 15 may have a configuration including current detecting elements for three phases.

The driving control unit 16 includes a control unit 17 and a driving unit 18.

The control unit 17 detects an input voltage value of the switching circuit 12 based on the information from the voltage detecting unit 11, and detects an output current value to the electric motor 6 based on the information from the current detecting unit 15, so as to output a drive signal that controls the switching circuit 12 on the basis of the input voltage value and the output current value.

The control unit 17 executes electric motor driving control using the PWM. In the present embodiment, the control unit 17 does not include a magnetic-pole position sensor added thereto, and produces respective PWM original signals Tup, Tun, Tvp, Tvn, Twp and Twn, which serve as origins of the respective PWM signals Up, Un, Vp, Vn, Wp and Wn that drive the respective MOS-FETs 13u, 13v, 13w, 14u, 14v and 14w on the basis of respective phase currents Iu, Iv, and Iw and the direct-current voltage Vdc. The control unit 17 outputs the respective PWM original signals Tup, Tun, Tvp, Tvn, Twp and Twn to the driving unit 18 to control driving of the switching circuit 12.

The driving unit 18 is constructed using, for example, a buffer, a logic IC and a level shift circuit, to generate the respective PWM signals Up, Un, Vp, Vn, Wp and Wn on the basis of the respective PWM original signals Tup, Tun, Tvp, Tvn, Twp and Twn from the control unit 17. The driving unit 18 outputs the respective PWM signals Up, Un, Vp, Vn, Wp and Wn to the switching circuit 12, to drive the respective MOS-FETs 13u, 13v, 13w, 14u, 14v and 14w of the switching circuit 12.

In FIG. 1, the driving control unit 16 includes two configurations of the control unit 17 and the driving unit 18, but it is just one example, and the function of the driving unit 18 may be incorporated in the control unit 17. In this case, the control unit 17 generates the respective PWM signals Up, Un, Vp, Vn, Wp and Wn and outputs the signals to the switching circuit 12, so that direct drive and control of the respective MOS-FETs 13u, 13v, 13w, 14u, 14v and 14w of the switching circuit 12 are realized.

Although not illustrated in FIG. 1, there is a compressor as a load including the electric motor 6. A fan is connected to a unit formed in one and the same housing in which the power converting apparatus 10 and the compressor as a load are included, for example, a dehumidifier. The driving control unit 16 also controls operations of the fan as well as operations of the compressor. According to the present embodiment, the driving control unit 16 executes switching control of a carrier frequency used for driving the switching circuit 12 on the basis of the noise level of the noise caused by the compressor and the fan. The fan can be also a load including the electric motor 6 as with the compressor. In FIG. 1, in the power converting apparatus 10, one electric motor 6 is connected thereto. However, this configuration is just one example, and two or more electric motors 6 can be connected thereto. If two or more electric motors 6 are connected to the power converting apparatus 10, the driving control unit 16 executes control independently for each load including an electric motor 6.

Figure 2:
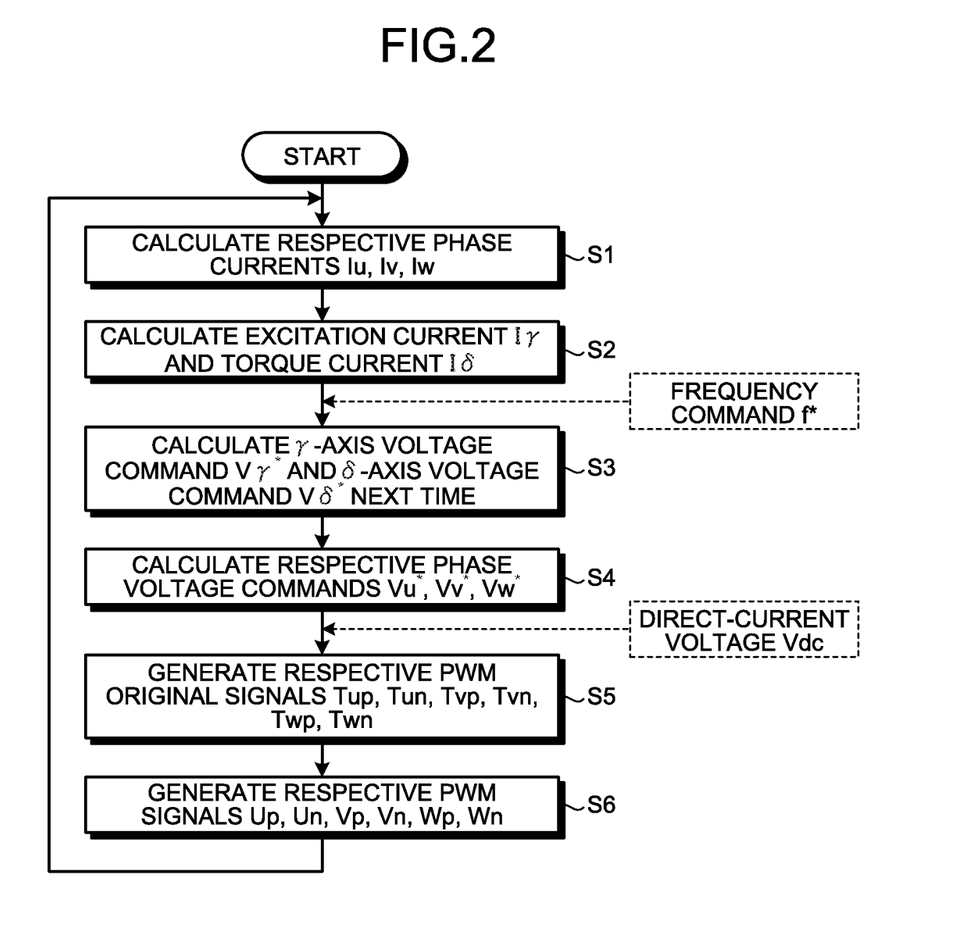
FIG. 2 is a flowchart illustrating an example of a PWM signal generating process according to the first embodiment.

Next, description is given for a process of generating the respective PWM signals Up, Un, Vp, Vn, Wp and Wn to be outputted to the switching circuit 12 in the driving control unit 16 on the basis of the respective phase currents Iu, Iv and Iw, and the direct-current voltage Vdc. FIG. 2 is a flowchart illustrating an example of a PWM signal generating process according to the first embodiment.

In the driving control unit 16, the control unit 17 calculates the respective phase currents Iu, Iv and Iw on the basis of the detection value detected by the current detecting unit 15 (Step S1).

Subsequently, the control unit 17 performs coordinate conversion of the phase currents Iu, Iv and Iw to calculate an excitation current Iγ indicating a γ-axis current, and a torque current Iδ indicating a δ-axis current. Specifically, the control unit 17 multiplies the phase currents Iu, Iv and Iw by a conversion matrix $[C_1]$ indicated in the following equation (1) to calculate the excitation current Iγ and the torque current Iδ (Step S2). In the equation (1), θ indicates an inverter rotation angle in a case where a rotation direction is clockwise.

[Formula 1]

$$[C_1] = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta - \frac{2}{3}\pi\right) \end{bmatrix} \quad (1)$$

When a sensor that detects a rotor position represented by a pulse encoder is used, an electric angular frequency of a rotor is substantially equal to a rotational frequency of an inverter device, and therefore a coordinate system in which the electric angular frequency of the rotor and the inverter device rotate at the same frequency is generally referred to as a "dq coordinate system". On the other hand, as in the present embodiment, when a sensor that detects the rotor position is not used, the dq axial coordinate cannot be accurately captured, and in reality the switching circuit 12 is operated with deviation from the dq coordinate system by a phase difference Δθ. With assuming such a case, the coordinate system in which rotation is expressed at the same frequency as the output voltage of the inverter device is referred to as a "γδ coordinate system", and is handled distinctively from the rotating system of coordinates. In the present embodiment, because the example of not using the sensor that detects the rotor position is described, γ and δ are assumed to be suffixes, following to the practice as described above.

Returning to FIG. 2, the control unit 17 executes various kinds of vector controls including a speed control on the basis of the excitation current Iγ, the torque current Iδ, and a frequency command f* from outside to calculate the γ-axis voltage command Vγ* and δ-axis voltage command Vδ* for a next time, for example, using the following equation (2) (Step S3).

[Formula 2]

$$\begin{bmatrix} V_\gamma^* \\ V_\delta^* \end{bmatrix} = \begin{bmatrix} R & O \\ O & R \end{bmatrix} \begin{bmatrix} i_\gamma \\ i_\delta \end{bmatrix} + \omega_1 \begin{bmatrix} O \\ \omega_\gamma^* \end{bmatrix} \begin{bmatrix} K_\gamma \cdot \phi_{\gamma err} \\ \frac{K_\delta \cdot K_\gamma}{\omega_1} \cdot \phi_{\gamma err} \end{bmatrix} \quad (2)$$

where $$\omega_1 = 2\pi f^* - \frac{p}{K \cdot (p + \omega_{spi})} \cdot i_\delta$$

$$\phi_{\gamma err} = \phi_\gamma^* - L_d \cdot i_\gamma - \phi_f \sqrt{1 - \left(\frac{L_q \cdot i_\delta}{\phi_f}\right)^2}$$

R: Motor winding resistance
$\omega_1$: Primary angular frequency
$\phi_\gamma^*$: Primary magnetic flux γ-axis component command
$K_\gamma$, $K_\delta$: Feedback gain
$\phi_{\gamma err}$: Magnetic flux error
K: Speed control proportional gain
$\omega_{spi}$: Integration gain
p: Proportional operator
$\phi_f$: Induced voltage constant
$L_d$: d-axis inductance
$L_q$: q-axis inductance Next, the control unit 17 uses the following equation (3) that is an inverse matrix $[C_1]^{-1}$ of the equation (1), to calculate respective phase voltage commands Vu*, Vv* and Vw* (Step S4).

[Formula 3]

$$[C_1]^{-1} = \sqrt{\frac{2}{3}} \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta - \frac{2}{3}\pi\right) \end{bmatrix} \quad (3)$$

Then, the control unit 17 computes an ON time or OFF time of each of the MOS-FETs 13u, 13v, 13w, 14u, 14v and 14w in one carrier cycle, on the basis of a ratio between the phase voltage commands Vu*, Vv* and Vw* of the switching circuit 12 and the direct-current voltage Vdc detected by the voltage detecting unit 11, that is, a ratio of each of the phase voltage commands Vu*, Vv* and Vw* to the direct-current voltage Vdc, to generate the respective PWM original signals Tup, Tun, Tvp, Tvn, Twp and Twn (Step S5).

Accordingly, the driving unit 18 generates the respective PWM signals Up, Un, Vp, Vn, Wp and Wn on the basis of the PWM original signals Tup, Tun, Tvp, Tvn, Twp and Twn outputted from the control unit 17 (Step S6). Thereafter, the driving control unit 16 repeats the processes from Steps S1 to S6 to output the respective PWM signals Up, Un, Vp, Vn, Wp and Wn in a timely manner, and drives the MOS-FETs 13u, 13v, 13w, 14u, 14v and 14w of the switching circuit 12, thereby to drive the electric motor 6.

Figure 3:
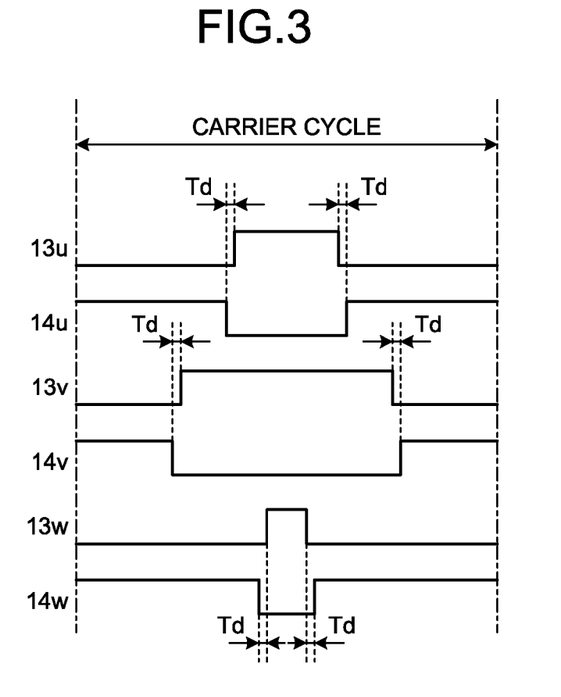
FIG. 3 is a chart illustrating an example of logic of the PWM signals according to the first embodiment.

FIG. 3 is a chart illustrating an example of the logic of the PWM signals according to the first embodiment. As illustrated in FIG. 3, a dead time Td is provided between turn-off of the upper arm or the lower arm of each phase and turn-on of the lower arm or the upper arm of each phase so as not to cause a short circuit because an on period of the MOS-FETs 13u, 13v and 13w that are the upper arms for the respective phases, and an on period of the MOS-FETs 14u, 14v and 14w that are the lower arms for the respective phases appear simultaneously.

In the present embodiment, the sensor that detects the rotor position is not used, and therewith increase in the cost is suppressed. However, because the electric angular frequency of the rotor substantially matches the rotational frequency on the side of the switching circuit 12 when using the sensor that detects the rotor position, highly accurate PWM control can be executed.

Subsequently, a process of switching the carrier frequency in the generation process of the PWM signals is described.

Figure 4:
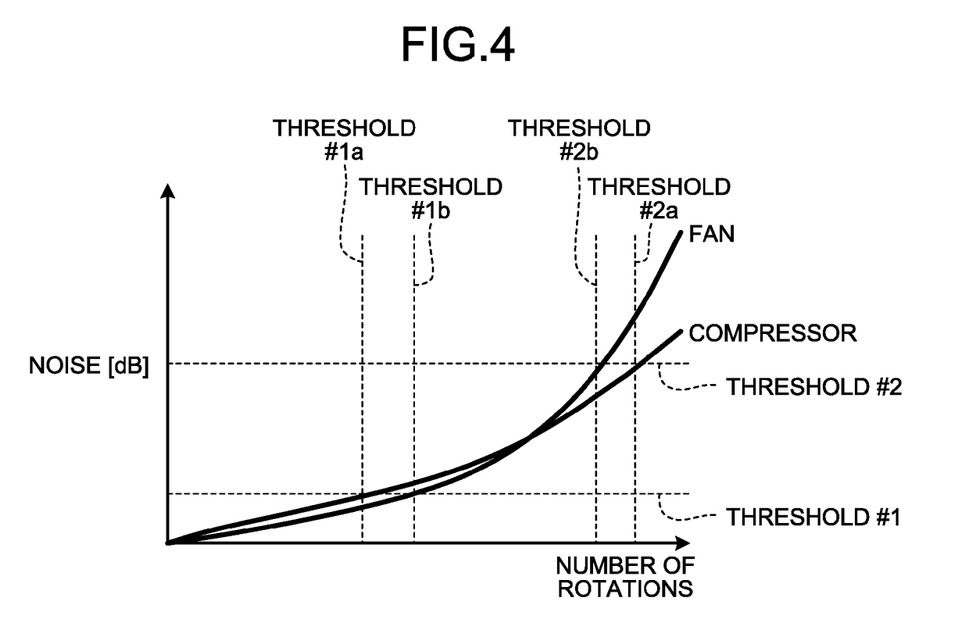
FIG. 4 is a graph showing characteristics of the number of rotations and noise of a compressor and a fan according to the first embodiment.

FIG. 4 is a graph illustrating characteristics of the number of rotations and noise of a compressor and a fan according to the first embodiment. The number of rotations is plotted on the horizontal axis, and the noise is plotted on the vertical axis. In the driving control unit 16, the control unit 17 sets a threshold #1, which is a noise level of the carrier noise at a carrier frequency of 13 kHz. A load current of the inverter 5 is set to the highest level to be assumed. The control unit 17 sets thresholds #1a and #1b that are the numbers of rotations of the compressor and the fan at which the noise level of noises caused by the compressor and the fan becomes equal to or higher than the threshold #1 that is the noise level of the carrier noise at the time of the carrier frequency of 13 kHz, as a condition for determination of switching the carrier frequency, on the basis of the characteristics of the number of rotations and the noise of the compressor and the fan illustrated in FIG. 4.

The carrier noise at the carrier frequency of 13 kHz is a noise caused by the driving or switching of the MOS-FETs 13u, 13v, 13w, 14u, 14v and 14w that are the switching elements using the carrier frequency of 13 kHz in the switching circuit 12, the compressor and the fan. The carrier noise is a noise whose noise level changes depending on the carrier frequency. If there are a plurality of noise sources, noises from the respective noise sources can be combined as the carrier noise. Meanwhile, the noise levels of the compressor and the fan illustrated in FIG. 4 indicate levels of noises caused irrespective of the carrier frequency, as in an operation sound. The noise that occurs irrespective of the carrier frequency is assumed as a driving noise.

The control unit 17 can ascertain the number of rotations of the electric motor 6 based on the current value to the electric motor 6 detected by the current detecting unit 15. When a plurality of electric motors 6 are connected thereto, and the compressor including the electric motor 6 and the fan including the electric motor 6 are connected to the power converting apparatus 10, the control unit 17 can ascertain the number of rotations of the compressor and the fan based on the current value to the electric motor 6 detected by the current detecting unit 15.

As in the case of the carrier frequency of 13 kHz, the control unit 17 subsequently sets a threshold #2 that is a noise level of the carrier noise at the carrier frequency of 10.7 kHz. Similarly, the load current of the inverter 5 is set to the highest level to be assumed. The control unit 17 sets thresholds #2a and #2b that are the numbers of rotations of the compressor and the fan in which the noise level of noises caused by the compressor and the fan becomes equal to or higher than the threshold #2 that is the noise level of the carrier noise at the time of the carrier frequency of 10.7 kHz, as a condition for determination of switching the carrier frequency, on the basis of the characteristics of the number of rotations and the noise of the compressor and the fan illustrated in FIG. 4.

The control unit 17 executes control to decrease the carrier frequency from 16 kHz to 13 kHz on the basis of a relation between the characteristics of the noise level of the carrier noise at each carrier frequency and the characteristics of the noise level at each of the numbers of rotations of the compressor and the fan when the number of rotations of the compressor increases and exceeds the threshold #1a or the number of rotations of the fan increases and exceeds the threshold #1b, during an operation at the carrier frequency of 16 kHz in a low noise region where the noise levels of the carrier noise and the driving noise are both low. Similarly, when the number of rotations of the compressor increases and exceeds the threshold #2a or the number of rotations of the fan increases and exceeds the threshold #2b during an operation at the carrier frequency of 13 kHz, the control unit 17 executes control to decrease the carrier frequency from 13 kHz to 10.7 kHz. The carrier frequency of 10.7 kHz described above is a frequency at which a noise A characteristic becomes about −3 dB on the high frequency region side in view of the frequency characteristics of human hearing, based on a graph of noise A characteristics prescribed in JIS (Japanese Industrial Standards) C1509.

Figure 5:
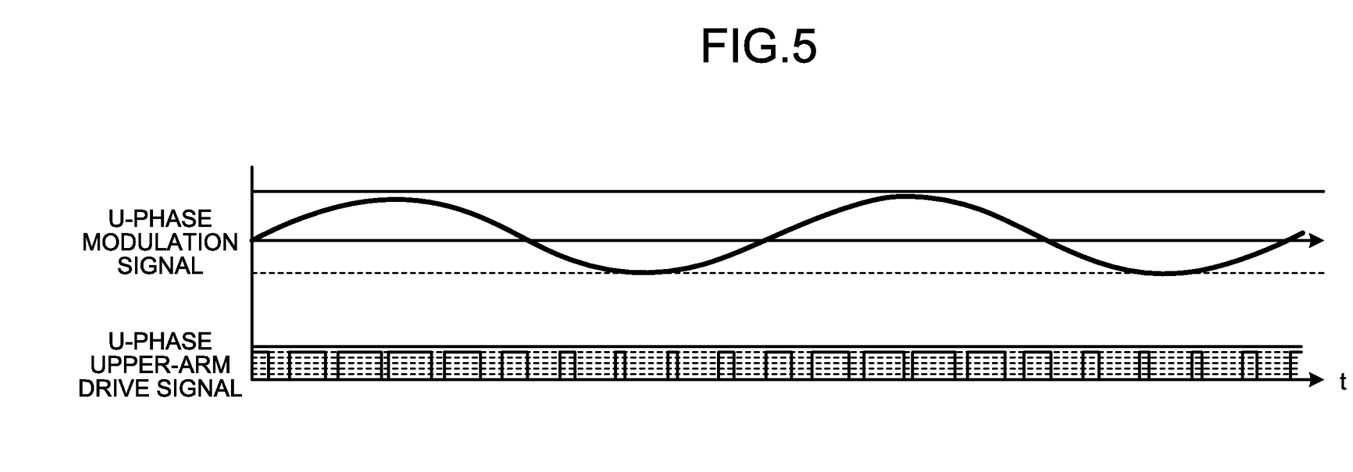
FIG. 5 is a chart illustrating a U-phase modulation signal, and a U-phase upper-arm drive signal when a carrier frequency is low.
Figure 6:
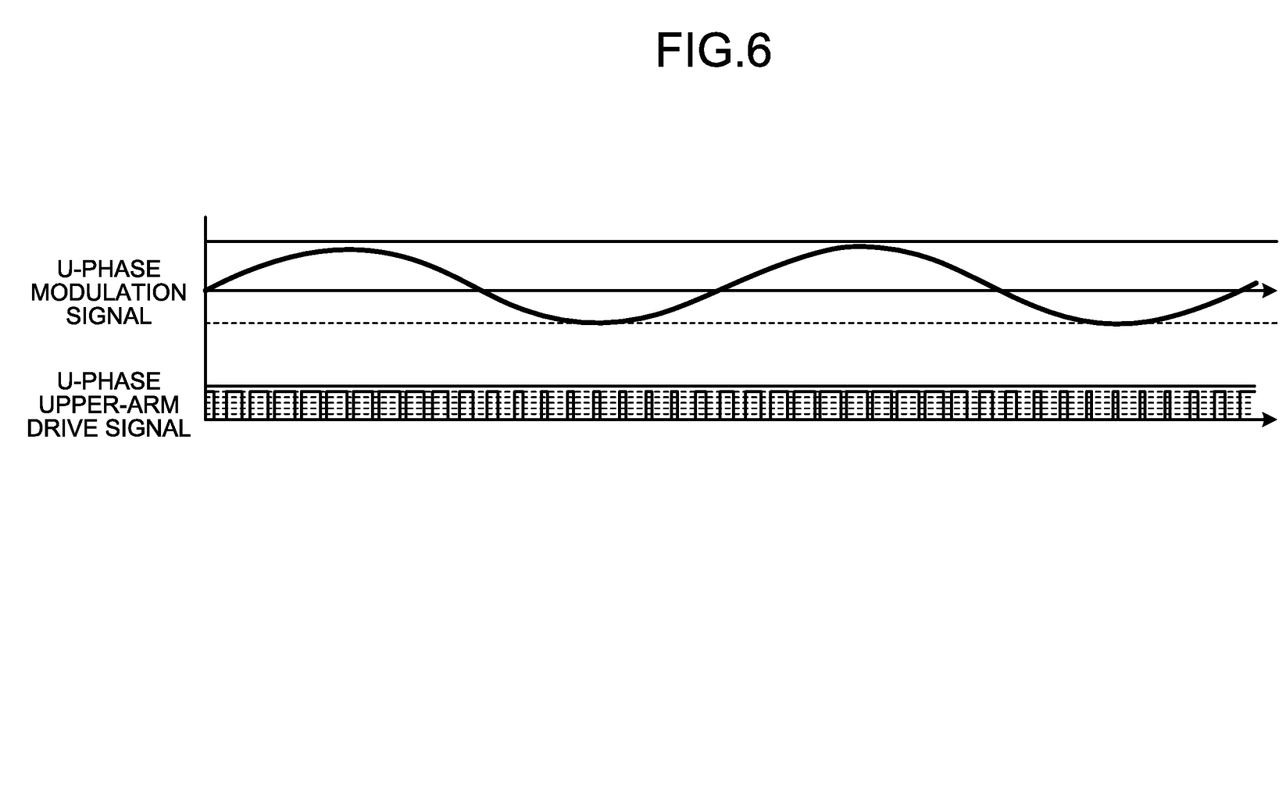
FIG. 6 is a chart illustrating a U-phase modulation signal, and a U-phase upper-arm drive signal when a carrier frequency is high.

FIG. 5 is a chart illustrating a U-phase modulation signal and a U-phase upper-arm drive signal when the carrier frequency is low. FIG. 6 is a chart illustrating a U-phase modulation signal and a U-phase upper-arm drive signal when a carrier frequency is high. The U-phase modulation signals in FIGS. 5 and 6 have the same waveform. The U-phase upper-arm drive signal illustrated in FIG. 5, that is, the waveform of the PWM signal indicates a state that the number of rotations of the compressor or the fan is higher than the case illustrated in FIG. 6, and the U-phase upper-arm drive signal illustrated in FIG. 6, that is, the waveform of the PWM signal indicates a state that the number of rotations of the compressor or the fan is lower than the case illustrated in FIG. 5.

With reference to FIGS. 4 to 6, the control unit 17 executes control to decrease the carrier frequency as the number of rotations of the compressor or the fan increases. It is because, for example, driving noise caused irrespective of the carrier frequency in the compressor or the fan is small when the number of rotations of the compressor or the fan is low in a unit in which the power converting apparatus 10, the compressor and the fan are installed in one and the same housing, and thus the control unit 17 increases the carrier frequency in order to decrease the carrier noise arising from the carrier frequency. On the other hand, when the number of rotations of the compressor or the fan becomes high, the driving noise caused irrespective of the carrier frequency in the compressor or the fan becomes large. Therefore, even if the carrier noise arising from the carrier frequency increases by decreasing the carrier frequency, as long as the carrier noise is smaller than the driving noise, the carrier noise is unnoticeable because of the driving noise of the compressor or the fan in the unit having the one and the same housing. In this manner, the control unit 17 controls the carrier frequency within a range in which the noise level of the carrier noise becomes lower than the noise level of the driving noise of the compressor or the fan.

As the number of rotations of the compressor or the fan increases, the control unit 17 controls the carrier frequency to be low, and thus a temperature rise under high load in the switching circuit 12 can be suppressed.

The case where the control unit 17 controls the carrier frequency has been described. However, the control is not limited thereto, and the driving unit 18 may control the carrier frequency.

As described above, according to the present embodiment, the power converting apparatus 10 executes control to switch the carrier frequency. In addition, in a unit in which the power converting apparatus 10, and the compressor or the fan, or the compressor and the fan that is a load including the electric motor 6 are installed in one and the same housing, the noise level of the carrier noise obtained by combining noises caused by the load and the power converting apparatus 10 due to driving of the MOS-FETs 13u, 13v, 13w, 14u, 14v and 14w that are the switching elements at the carrier frequency is decreased to be smaller than the noise level of the driving noises from a plurality of noise sources that occur irrespective of the carrier frequency in the one and the same housing. Accordingly, increase in the noise level can be suppressed over the entire unit, and a switching loss under high load can be decreased, thereby enabling to realize downsizing, weight saving of the unit based on suppression of temperature rise, and high performance. Because it is not required to take heat radiation measures in the power converting apparatus 10, cost reduction can be realized.

The case where there are a plurality of noise sources has been described. However, the present invention is not limited thereto. The present invention can be applied to a case where there is only one noise source. The noise source is not limited to the load of the compressor or the fan that is driven by an operation of the electric motor 6, and may cover the electric motor 6.

Regarding the noise of the compressor illustrated in FIG. 4, the noise level changes not only due to the number of rotations, but also due to fluctuations of torque or the operation. Therefore, by setting a threshold of the compressor by taking a plurality of factors into consideration, the control unit 17 can switch the carrier frequency appropriately, thereby enabling to acquire such effects that an increase in the noise level can be suppressed and a switching loss can be decreased.

Similarly, regarding the noise of the fan illustrated in FIG. 4, the noise level changes not only due to the number of rotations, but also due to the torque or the humidity and an air passage of the environment in which the fan is installed. Therefore, by setting a threshold of the fan by taking a plurality of factors into consideration, the control unit 17 can switch the carrier frequency appropriately, thereby enabling to acquire such effects that an increase in the noise level can be suppressed and a switching loss can be decreased.

In the present embodiment, description has been presented as to the case where the compressor and the fan are the noise sources that generate driving noises irrespective of the carrier frequency in the same housing. However, another configuration that generates the driving noise irrespective of the carrier frequency in the same housing, for example, a converter may be the noise source. In the power converting apparatus 10, there is an electromagnetic noise caused with a situation that the current flows to the reactor 2 connected to the alternating-current power source 1. Particularly, in the case of an active converter using a switching unit for improving a power factor of the power source and suppressing harmonics, and controlling a voltage of the smoothing capacitor 4, a large noise occurs due to current fluctuation caused by switching. The noise level can be suppressed also by inserting a non-magnetic spacer into a gap of the reactor 2. The compressor and the fan are used, for example, for a dehumidifier, an air conditioner and a refrigeration apparatus, and the compressor is particularly used for a device that has a refrigeration cycle.

For the compressor, the fan and the reactor 2 contained in the same housing, superposition of the driving noises can be suppressed by shifting each of their resonant frequencies. Superposition of the driving noises can be suppressed also by setting the carrier frequency to a frequency different from the resonant frequencies. Shifting of the resonant frequencies and setting of the carrier frequency to a frequency different from the resonant frequencies can be performed not only for the compressor, the fan and the reactor 2, but also for other configurations that generate the driving noise irrespective of the carrier frequency in the same housing.

In the present embodiment, the determination for switching the carrier frequency is performed by setting the threshold values for the compressor and the fan individually, but the present invention is not limited thereto. The determination for switching the carrier frequency can be also performed using a noise level obtained by combining noise levels of the driving noises of the compressor and the fan. In the power converting apparatus 10, the control unit 17 executes control to decrease the noise level of the carrier noise to be lower than the noise level of the combined noises of a plurality of driving noises.

In the present embodiment, the load including the electric motor 6 is the compressor or the fan. However, it is just an example, and other configurations can be used for the load including the electric motor 6.

In the present embodiment, the frequencies to be used for switching of the carrier frequency are 16 kHz, 13 kHz, and 10.7 kHz. However, these carrier frequencies are just examples, and other values may be used. For example, any number of carrier frequencies may be selected within a frequency range from 10.7 kHz to 20.0 kHz. The number of frequencies to be used for switching of the carrier frequency is not limited to three, and at least two frequencies suffice therefor.

The load current of the inverter 5 is set to the highest level to be assumed when the noise level of the carrier noise at the carrier frequency is set. However, the present invention is not limited thereto, and conditions other than the load current may be used.

When setting the noise level of the carrier noise at the carrier frequency, the noise level can be set more appropriately by performing correction according to the frequency of the driving noise on the basis of hearing sensitivity of a user. The noise level of the driving noise may be an overall value.

In the present embodiment, the carrier frequency is switched using the number of rotations as an index on the basis of the relation between the characteristic of the noise level of the carrier noise at each carrier frequency and the characteristic of the noise level at each of the numbers of rotations of the compressor and the fan. However, the index to be used for switching of the carrier frequency is not limited to this manner. For example, a plurality of noise meters may be installed in the housing to execute switching control of the carrier frequency based on a measurement value of the noise level of the carrier noise measured by the noise meter and a measurement value of the noise level of the driving noise measured by the noise meter.

It is a mainstream to generally use an Si-based semiconductor using a silicon (Si) material for the rectifying devices 3a to 3d of the rectifier 3 and the semiconductor elements of the MOS-FETs 13u, 13v, 13w, 14u, 14v and 14w that are switching elements of the switching circuit 12. However, a wide bandgap semiconductor (hereinafter, "WBG semiconductor") using a material of silicon carbide (SiC), gallium nitride (GaN) or diamond may be used.

The semiconductor element formed of the WBG semiconductor has high voltage resistance and high allowable current density. Therefore, downsizing of the semiconductor element is possible, and downsizing of the rectifier 3 and the switching circuit 12 is also possible by using the downsized semiconductor element. Further, downsizing and weight saving of the power converting apparatus 10 become possible by using the downsized rectifier 3 and switching circuit 12.

The semiconductor element formed of the WBG semiconductor has also high thermal resistance. Therefore, downsizing of a heat radiation fin of a heatsink or air cooling of a water cooling unit becomes possible, thereby enabling further downsizing of the power converting apparatus 10.

Further, the semiconductor element formed of the WBG semiconductor has a low power loss. Therefore, the semiconductor element can achieve high efficiency, and as a result, the power converting apparatus 10 can achieve high efficiency.

The semiconductor elements are desired to be formed of the WBG semiconductor. However, one of the semiconductor elements may be formed of the WBG semiconductor, and the effect described above can be acquired even when the WBG semiconductor is used partially for the semiconductor elements.

A higher loss reduction effect can be acquired by using the WBG semiconductor, as switching is performed at the higher carrier frequency. Therefore, at the time of high-frequency switching at 10 kHz or higher in the present embodiment, needless to mention, a high loss reduction effect can be acquired.

In the power converting apparatus 10, the inverter can be a chemical-capacitor-less inverter without using an electrolytic capacitor for the smoothing capacitor 4, but using a film capacitor or a ceramic capacitor. In the power converting apparatus 10, downsizing of a control substrate by means of downsizing of the capacitor and suppression of power line harmonics can be achieved, thereby enabling downsizing of the reactor 2.

Second Embodiment

Figure 7:
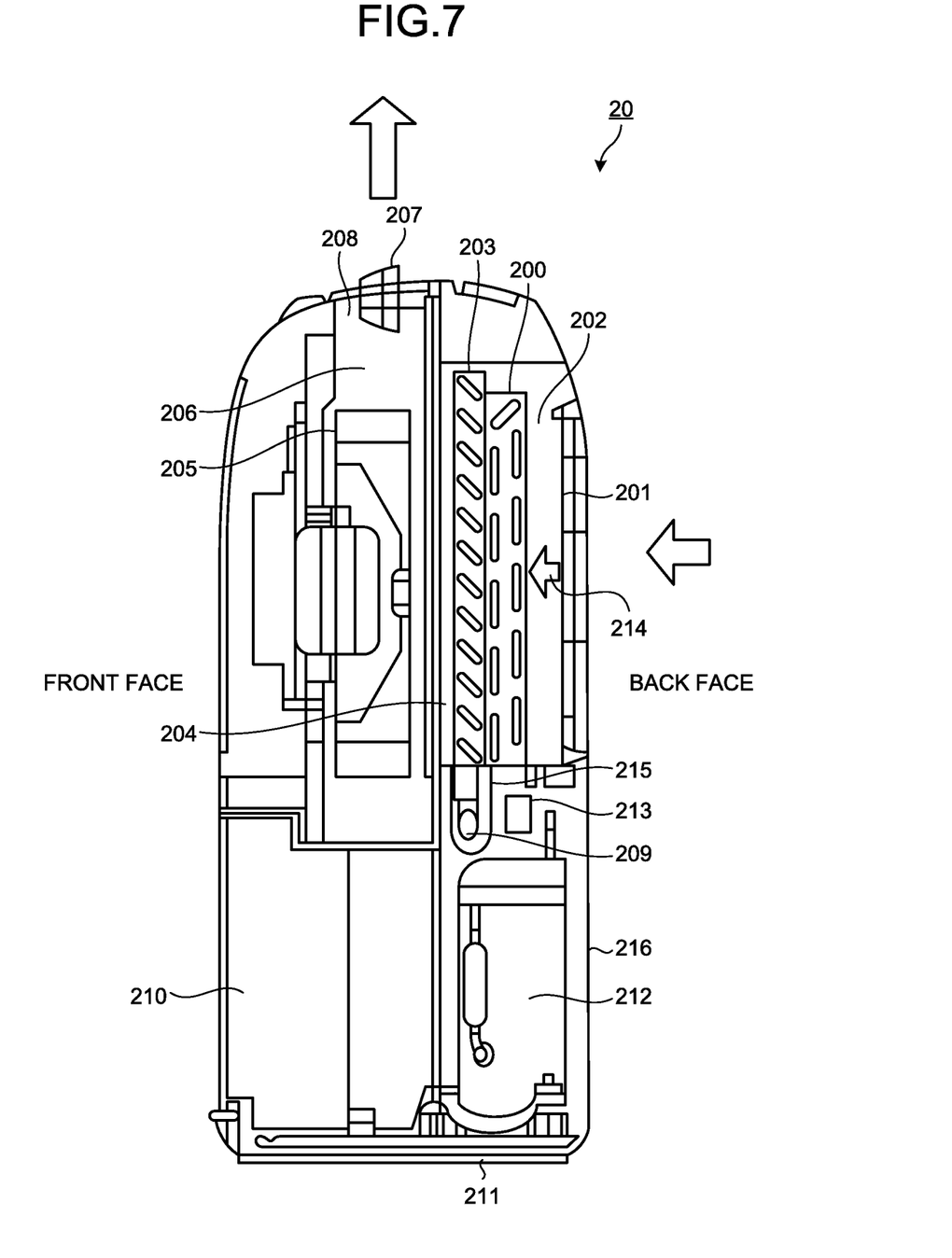
FIG. 7 is a side sectional view illustrating a dehumidifier according to a second embodiment.

In a second embodiment, a control target of the power converting apparatus 10 according to the first embodiment is a dehumidifier. FIG. 7 is a sectional side view illustrating a dehumidifier 20 according to the second embodiment. The dehumidifier 20 is a unit in which the power converting apparatus 10 according to the first embodiment illustrated in FIG. 1 and the load using the electric motor 6 are installed in one and the same housing. In FIG. 7, an evaporator 200 is provided in an air passage 202 on the downstream side of an inlet port 201. A condenser 203, a fan duct 204, a fan 205 and a blowout duct 206 are provided on the downstream side of the air passage 202. An air outlet 208 having a wind-direction variable vane 207 is provided through the blowout duct 206. A tank 210 is installed diagonally downward from a drain port 209 provided below the evaporator 200, and the drain port 209 and the tank 210 are connected to each other by a pipe.

The evaporator 200 and the condenser 203 are connected to a compressor 212 fitted on a bottom plate 211 and mounted with a direct-current brushless motor by a refrigerant pipe to constitute a refrigerating cycle. A power converting apparatus 213 drives the direct-current brushless motor mounted on the compressor 212 so as to be able to change a rotation speed thereof. The dehumidifier 20 is configured to be portable by housing all the components in a dehumidifier body 216. The power converting apparatus 213 is the power converting apparatus 10 according to the first embodiment.

Operations of the dehumidifier 20 are described next. Upon start of operations of the compressor 212, a compressed high-temperature and high-pressure refrigerant gas flows into the condenser 203 to maintain the condenser 203 at a high temperature. The refrigerant gas in the condenser 203 is cooled and condensed by inlet air 214 from the inlet port 201 by the operations of the fan 205, and becomes a high-temperature and high-pressure gas-liquid mixed state and flows out from the condenser 203. The refrigerant gas is depressurized by passing through a narrowing-down device (not illustrated), for example, a capillary tube or an expansion valve to become a low-temperature and low-pressure refrigerant liquid and flows into the evaporator 200. The refrigerant liquid in the evaporator 200 is heated and evaporated by the inlet air 214 to become a low-pressure refrigerant gas and sucked in the compressor 212.

The inlet air 214 is cooled by the evaporator 200 and an air temperature drops, and thus moisture contained in the air more than saturated water vapor is condensed. The condensed moisture is received by a drain pan 215, passes through the drain port 209, and is stored in the tank 210. In this manner, the inlet air 214 is cooled by passing through the evaporator 200, and absolute humidity thereof drops. Thereafter, the inlet air 214 with dropped absolute humidity is heated by passing through the condenser 203 to become dehumidified air having a normal temperature. The dehumidified air then passes through the fan duct 204, and it passes through the blowout duct 206 and is discharged from the air outlet 208 by the fan 205. Accordingly, the dehumidifier 20 can perform dehumidification without decreasing the temperature in a room where the dehumidifier 20 is installed, and can dry laundry by using discharged air.

In the present embodiment, the dehumidifier 20 constructed in a single unit is normally used indoor. Therefore, the dehumidifier 20 has a high possibility to be operated near people's living areas, and thus it is required to suppress noise from the dehumidifier 20 including the carrier noise caused by switching of the switching circuit 12 of the power converting apparatus 213.

Accordingly, as in the power converting apparatus 10 described in the first embodiment, the power converting apparatus 213 can suppress a switching loss, while suppressing deterioration due to superposition of noises by executing the switching control of the carrier frequency on the basis of the relation between the noise level of the carrier noise and the noise level of the driving noise of the compressor and the fan.

In the present embodiment, because the dehumidifier 20 using the power converting apparatus 213 similar to the power converting apparatus 10 described in the first embodiment can suppress a switching loss under high load, downsizing of the power converting apparatus 213 becomes possible, thereby enabling to realize low cost and improve the portability.

By configuring the power converting apparatus 213 to have the chemical-capacitor-less inverter, the control substrate can be downsized by downsizing the capacitor and power line harmonics can be suppressed, thereby enabling to downsize the reactor 2. As a result, downsizing and weight saving of the dehumidifier 20 can be realized. In the dehumidifier 20, because upper heavy parts can be avoided, the balance of the center of mass is improved, and stability can be improved.

In the case of the unit to be hand-carried and used such as the dehumidifier 20, the frequency of insertion and removal of a power plug in and from an outlet is high. Therefore, an increase in size and cost occurs due to measures using a protection circuit in order to prevent a failure or deterioration of components due to an excessive inrush current at the time of turning on the power. However, occurrence of the inrush current can be suppressed by configuring the power converting apparatus 213 to have the chemical-capacitor-less inverter that does not use an electrolytic capacitor, and thus downsizing and weight saving of the dehumidifier 20 can be realized, and low cost can be realized.

In the present embodiment, description has been made for the dehumidifier 20 including the power converting apparatus 10 described specifically in the first embodiment and all the components including the load using the electric motor 6 illustrated in FIG. 1, which are contained in one and the same housing. However, it is just an example, and the present invention is not limited thereto. The power converting apparatus 10 can be applied to, for example, an air conditioner and a refrigeration apparatus.

INDUSTRIAL APPLICABILITY

As described above, the power converting apparatus according to the present invention is useful for power conversion, and is particularly suitable in a case of being connected to an electric motor.

The invention claimed is:

1. A power converting apparatus that outputs an alternating-current power to drive an electric motor, the power converting apparatus comprising:
   a switching circuit that converts, based on driving of switching elements, an input direct-current power into an alternating-current power and outputs the alternating-current power; and
   a driving control unit capable of controlling a carrier frequency and controlling the driving of the switching elements, wherein
   the driving control unit sets a threshold of a noise level of a carrier noise at a specified carrier frequency for a noise level of a carrier noise obtained by combining noises that occur in the electric motor and the power converting apparatus due to the driving of the switching elements at the carrier frequency, sets a threshold of the number of rotations at which a noise level of a driving noise becomes a noise level of the threshold set at the specified carrier frequency for a noise source including the electric motor, for a noise level of driving noises from a plurality of noise sources that occur irrespective of the carrier frequency in one and the same housing in which the power converting apparatus and the electric motor are contained, and controls the carrier frequency based on the number of rotations of the noise source including the electric motor and the threshold of the number of rotations.

2. The power converting apparatus according to claim 1, wherein when the number of rotations of the noise source including the electric motor exceeds the threshold of the number of rotations, the driving control unit controls the carrier frequency to be the specified carrier frequency with the carrier frequency being made smaller than in the present value, and to decrease the noise level of the carrier noise to be lower than a noise level of each of a plurality of driving noises.

3. The power converting apparatus according to claim 1, wherein when the number of rotations of the noise source including the electric motor exceeds the threshold of the number of rotations, the driving control unit controls the carrier frequency to be the specified carrier frequency with the carrier frequency being made smaller than in the present value, and to decrease the noise level of the carrier noise to be lower than a noise level of a noise obtained by combining a plurality of driving noises.

4. The power converting apparatus according to claim 1, wherein of the plurality of noise sources, a noise source including the electric motor is a compressor and a fan.

5. The power converting apparatus according to claim 1, wherein of the plurality of noise sources, a noise source including the electric motor is a compressor and a fan, and a noise source that does not include the electric motor is a converter.

6. The power converting apparatus according to claim 5, wherein the converter is an active converter.

7. The power converting apparatus according to claim 4, wherein the compressor is a compressor that constitutes a refrigeration cycle.

8. The power converting apparatus according to claim 1, wherein the noise level of the driving noise is an overall value.

9. The power converting apparatus according to claim 1, wherein the noise level of the driving noise can be frequency-corrected based on hearing sensitivity of a user.

10. The power converting apparatus according to claim 1, wherein a frequency range of the carrier frequency is from 10.7 kHz to 20.0 kHz.

11. The power converting apparatus according to claim 1, comprising a smoothing circuit that smooths a direct-current power obtained by conversion from an alternating-current power in a rectifier circuit and outputs the smoothed direct-current power to the switching circuit, wherein
a capacitor of the smoothing circuit is a ceramic capacitor or a film capacitor.

12. The power converting apparatus according to claim 1, wherein a wide bandgap semiconductor is used for a semiconductor element including the switching element.

13. A dehumidifier comprising the power converting apparatus according to claim 1.

14. An air conditioner comprising the power converting apparatus according to claim 1.

15. A refrigeration apparatus comprising the power converting apparatus according to claim 1.

16. The power converting apparatus according to claim 1, wherein the driving control unit sets a threshold of a noise level of a carrier noise in regard to a plurality of specified carrier frequencies, for each of the plurality of specified carrier frequencies, sets thresholds of the numbers of rotations, at which the noise level of the driving noise becomes a noise level of each threshold set at each of the specified carrier frequencies in regard to the noise source including the electric motor, and controls the carrier frequency on a basis of the number of rotations of the noise source including the electric motor and each threshold of the number of rotations.

17. The power converting apparatus according to claim 16, wherein when the number of rotations of the noise source including the electric motor exceeds the threshold of the number of rotations, the driving control unit controls the carrier frequency to be a specified carrier frequency corresponding to the threshold of the number of rotations with the carrier frequency being made smaller than in the present value, and to decrease the noise level of the carrier noise to be lower than the noise level of each of the plurality of driving noises.

18. The power converting apparatus according to claim 16, wherein when the number of rotations of the noise source including the electric motor exceeds the threshold of the number of rotations, the driving control unit controls the carrier frequency to be a specified carrier frequency corresponding to the threshold of the number of rotations with the carrier frequency being made smaller than in the present value, and to decrease the noise level of the carrier noise to be lower than the noise level of a noise obtained by combining the plurality of driving noises.

* * * * *